United States Patent [19]

Denton et al.

[11] Patent Number: 4,762,641
[45] Date of Patent: Aug. 9, 1988

[54] VERMICULITE MOULDING COMPOSITIONS AND ARTICLES MADE THEREFROM

[75] Inventors: Sven T. Denton, Stockport; Alan Atkinson, Rochdale, both of England

[73] Assignee: T & N Materials Research Limited, Manchester, England

[21] Appl. No.: 55,889

[22] Filed: Jun. 1, 1987

[30] Foreign Application Priority Data

Jul. 2, 1986 [GB] United Kingdom ................. 8616184

[51] Int. Cl.$^4$ ............................................ C04B 20/06
[52] U.S. Cl. ............................................... 252/378 R
[58] Field of Search ................................... 252/378 R

[56] References Cited

U.S. PATENT DOCUMENTS 3,916,057 10/1975 Hatch et al. .................... 252/378 R
3,953,357 4/1976 Preston et al. .................. 252/378 R
4,130,687 12/1978 Ballard et al. .................. 252/378 R

FOREIGN PATENT DOCUMENTS

A1-2241857 of 0000 Fed. Rep. of Germany .
A-2122699 1/1984 United Kingdom .

Primary Examiner—Mark L. Bell
Attorney, Agent, or Firm—Nixon & Vanderhye

[57] ABSTRACT

A moulding composition comprising particles of gas-exfoliated vermiculite (a category which includes thermally exfoliated vermiculite) contains as binder very fine particles (diameter below 50 μm) of vermiculite from which interstitial magnesium ions have been at least partially removed and which has been swollen in water.

The composition is particularly suitable for the manufacture of articles required to function in air at temperatures above 250° C., such as gaskets for the exhaust systems of internal combustion engines.

6 Claims, No Drawings

VERMICULITE MOULDING COMPOSITIONS AND ARTICLES MADE THEREFROM

This invention relates to vermiculite moulding compositions and articles made therefrom.

In the manufacture of certain articles required to function in air at temperatures of 250° C. and higher (an example being a lid for a container of casting metal) it has often been the practice to shape the article from a moulding composition which incorporates thermally exfoliated vermiculite (TEV). TEV is made by flash-heating mineral vermiculite to 750°–1000° C., at which temperature the water (free and combined) in the ore vaporises rapidly and the steam generated forces apart the silicate sheets which form the raw mineral, so bringing about an expansion of 10–20 times perpendicular to the plane of the sheets. The granules formed have a chemical composition which—apart from the loss of $H_2O$—is virtually identical with that of the raw mineral.

A product very similar to TEV can be made by treating raw vermiculite with a liquid that penetrates between the silicate sheets and subsequently evolves a gas to bring about exfoliation. Acidic hydrogen peroxide, from which oxygen is evolved, is commonly employed for this purpose.

A characteristic of gas-exfoliated vermiculite—whether the gas is steam at 750°–1000° C. or oxygen below 100° C.—is that on the application of pressure to compact it, it shows little tendency to cohere. Accordingly, moulding compositions incorporating it have usually included either an organic binding agent, i.e. a combustible material, or an inorganic cement, which leads to a somewhat rigid, incompressible structure.

According to the present invention, a moulding composition comprising particles of gas-exfoliated vermiculite contains as binder a different form of vermiculite, namely very fine particles (diameter below 50 μm) of vermiculite from which the interstitial magnesium ions (i.e. those situated between the silicate sheets of the mineral's crystal structure) have been at least partially removed and which has been swollen in water.

Binder vermiculite for use according to the invention can be prepared according to British Patent Specification No. 1 593 383, as by treating vermiculite ore first with saturated sodium chloride solution to exchange $Mg^{2+}$ for $Na^+$, then with n-butyl ammonium chloride to replace $Na^+$ with $n-C_4H_9NH_3^+$. On washing with water swelling takes place. The swollen material is then subjected to high shear to produce an aqueous suspension of very fine vermiculite particles. The use of another, and preferred, form of binder vermiculite is described in the Examples later in this specification.

The weight proportion of gas-exfoliated vermiculite:- binder vermiculite in the moulding composition is preferably in the range 5:95–90:10, particularly 20:80–70:30. Because the gas-exfoliated vermiculite is (weight for weight) currently only about one-thirtieth of the price of the binder vermiculite, it will often be preferred to use the former material in major proportion, even though—as we have found—the tensile strength of products moulded from compositions according to the invention increases with the weight proportion of binder vermiculite therein.

Ordinarily the moulding composition will contain an appreciable proportion of water, which arises from the presence of water in the binder vermiculite employed, this having been obtained by a swelling step that utilises water.

Moulding of the composition may be carried out by hot pressing, as between plates. If, as will often be the case, sheet-form material is required, moulding can alternatively be performed by using a doctor blade; by pressing between porous sheets (e.g. paper) and then moistening to bring about release; by extrusion, with treatment of the surface of the extrudate to reduce its tackiness prior to handling; or by a papermaking procedure as in the well-known Fourdrinier process.

The optimum density for sheet material will depend on the composition from which it has been moulded and on the intended use. Ordinarily, density will be in the range 200–2,200 kg/m$^3$, the range 350–1600 kg/m$^3$ being preferred.

An unusual feature encountered in preparation of moulded sheet products is that if cutting scrap is reconstituted to mouldable form by vigorous agitation with water, and used after the supernatant liquid (with its content of suspended fines) has been discarded, then the sheet obtained has an improved tensile strength.

The sheet-form material is specially suited to the manufacture of gaskets, particularly those required to function in air at a temperature of 250° C. or above, such as gaskets for the exhaust systems of internal combustion engines. For use as gaskets, the sheet material will usually be bonded to a reinforcement layer, such as woven wire, metal foil, fibre glass tissue, stainless steel sheet or punched steel sheet.

For some purposes, it may be desirable to include in the compositions fillers of fine particle size, particularly plate-like fillers such as talc, or (in an amount not greater than about one-quarter of the total weight of the composition) reinforcement fibre such as chopped, water-dispersible fibre glass, suitably of length 3 mm.

The invention is further illustrated by the following Examples, in which the binder vermiculite employed was a colloidal dispersion of the kind described in Preliminary Data Sheet headed "Vermiculite Dispersions" (4/85/GPS/2.5M dated May 1, 1985) of Grace Construction Products, where it is recommended as replacement for asbestos fibres (i.e. as reinforcement, not as binder) in numerous high temperature applications, including industrial gasketing products.

EXAMPLE

The following ingredients were mixed with moderate shear to form a stiff aqueous paste:
Thermally exfoliated vermiculite, passing 1 mm aperture sieve: 0.50 kg
Binder vermiculite; 30% aqueous suspension, 1.67 kg=dry weight 0.50 kg Lumps of the aqueous paste were placed between two sheets of aluminium foil and pressed between heated platens (100° C.) for 5 minutes to a sheet of thickness 1.75 mm, low moisture content, and an even surface. Its density was 350 kg/m$^3$. For the next step, this was increased by the application of pressure to 900 kg/m$^3$. The aluminum foil was then peeled away.

Rings of inner diameter 5.57 mm and outer diameter 8.5 mm were then cut from the sheet and affixed with a thin layer of the binder vermiculite dispersion to each side of stainless steel support rings (inner diameter 5.57 mm, outer diameter 11.1 mm, thickness 0.5 mm) to give gaskets with an overall thickness of ca 4 mm. These were allowed to dry out in air overnight before testing.

The gaskets were tested for their sealing performance by clamping between machined flanges (BS 1560).

A clamping load of 21.8 tonnes was applied and nitrogen gas pressure was increased until the gaskets showed the first signs of leaking. On average this occurred at a pressure of 25 MPa (3500 psi).

The moulding composition of the above Example is also useful as an injectable sealant; and the sheet material formed from it by hot-pressing is also useful as thermal insulation and as vibration absorber at high temperatures.

EXAMPLE 2

Sheets were prepared as in Example 1 but with twice the thickness (3.5 mm), and gaskets were formed from them. At a clamping load of 21.8 tonnes, their sealing pressure was 39 MPa (5500 psi).

EXAMPLE 3

Material was prepared with the same composition as in Example 1 but the thermally exfoliated vermiculite was sheared dry (prior to mixing with the binder vermiculite) in a domestic blender for 5 minutes, to break up the particles. The resulting paste was more homogeneous and cohesive, making it easier to spread.

Gaskets made from 1.75 mm-thick sheets of this material were pressure tested with a clamping load of 21.8 tonnes, and sealed 33 MPa (4750 psi).

EXAMPLE 4

The procedure of Example 1 was followed generally, but with the use of thermally exfoliated vermiculite particles of diameter 1–2 mm instead of particles less than 1 mm in diameter.

Gaskets made from 1.75 mm-thick sheets of this material were pressure tested at a clamping load of 21.8 tonnes, and sealed a pressure of 32 MPa (4500 psi).

EXAMPLE 5

Gaskets were prepared using the procedure in Example 1, but with the following composition:
Thermally exfoliated vermiculite: 0.33 kg
Binder vermiculite, 2.23 kg wet, =dry weight of 0.67 kg
When pressure treated with a clamping load of 21.8 tonnes the gaskets sealed 28 MPa (4000 psi).

EXAMPLE 6

Gaskets were prepared as in Example 1 but with the composition:
Thermally exfoliated vermiculite: 0.67 kg
Binder vermiculite, 1.10 kg wet=dry weight of 0.33 kg
At clamping load of 21.8 tonnes, they sealed a pressure of 7 MPa (1020 psi).

EXAMPLE 7

Sheet of thickness 1.75 mm produced in accordance with Example 1 was bonded to sheets of 10 $\mu$m-thick electroformed nickel foil reinforcement using a nitrile-phenolic adhesive. Laminates were prepared with (i) two sheets of vermiculite enclosing one sheet of nickel foil; and (ii) one sheet of vermiculite sandwiched between two nickel foils.

Both types of laminate could easily be cut into gasket shapes, using a frame-cutter, and were stronger and more flexible than unreinforced vermiculite sheets.

When tested as gaskets, they sealed the following pressures
(i) vermiculite/nickel/vermiculite: 27 MPa (3900 psi)

(ii) nickel/vermiculite/nickel: 3 MPa (450 psi)

EXAMPLE 8

Gaskets made in accordance with Example 1 were heated in air at 450° C. for 10 hours and then subjected to the standard sealing test. They sealed on average a pressure of 20 MPa (2900 psi), making their performance similar to that of unheated gaskets, i.e. 25 MPa (3500 psi).

EXAMPLE 9

(THERMAL-CYCLING TEST) ("SHELL TEST")

A gasket made in accordance with Example 1 was subjected to a thermalcycling test in the following manner.

The gasket was clamped between two machined flanges with a load of 21.8 tonnes so as to enclose a chamber of ca 200cm$^3$. Nitrogen gas was introduced into the chamber to a pressure of 5.2 MPa (740 psi). The whole apparatus was then heated to 450° C. (at a rate of 300°/hr) during which time pressure was released to give 2.1 MPa (300 psi).

The apparatus was then allowed to cool to 25° and the pressure remeasured. This thermal cycling was repeated a further four times with these results:

| | Thermal Cycle Test Temp (°C.) | Pressure (MPa (psi) |
|---|---|---|
| 1st cycle | 450 | 2.1 (300) |
| | 25 | 1.26 (180) |
| 2nd cycle | 450 | 2.1 (300) |
| | 25 | 1.26 (180) |
| 3rd, 4th and 5th cycles, each | 450 | 2.1 (300) |
| | 25 | 1.26 (180) |

It can be seen that the gasket suffered no loss of performance as a result of cycling between extremes of temperature.

EXAMPLE 10

Discs were cut from vermiculite sheet made in accordance with Example 1 and were assembled onto a threaded steel rod and clamped between steel washers. The resulting assembly was machined to give a smooth, cylindrical roller, of the type suitable for conveying hot glass without scratching.

EXAMPLE 11

Paste material with the composition disclosed in Example 1 was moulded under heat and pressure into the shape of a crucible. After drying, the crucible was used successfully to melt a charge of aluminium metal. The crucible was light in weight and resistant to impact. It kept its heat well, and was not wetted by the molten metal.

We claim:

1. A moulding composition consisting essentially of particles of gas-exfoliated vermiculite and, as binder, very fine particles, having a diameter below 50 $\mu$m, of vermiculite from which the interstitial magnesium ions have been at least partially removed and which has been swollen in water.

2. Moulding composition according to claim 1, in which the weight proportion of gas-exfoliated vermiculite:binder vermiculite is in the range 5:95–90:10.

3. Moulding composition according to claim 2, in which said weight proportion is in the range 20:80–70:30.

4. Moulding composition according to claim 1, in which the gas-exfoliated vermiculite is thermally exfoliated material.

5. An article moulded from a composition according to claim 1.

6. Sheet form material moulded by hot pressing from a composition according to claim 1.

* * * * *